United States Patent [19]

Muth

[11] 4,226,402
[45] Oct. 7, 1980

[54] POST PULLER

[76] Inventor: James E. Muth, 5050 Athens-Boonesboro Rd., Rte. 7, Lexington, Ky. 40511

[21] Appl. No.: 30,692

[22] Filed: Apr. 16, 1979

[51] Int. Cl.³ .............................................. B66F 1/02
[52] U.S. Cl. .................................... 254/30; 254/124; 254/132; 294/106
[58] Field of Search ............... 294/92, 106, 111, 113, 294/117; 254/30, 132, 124

[56] References Cited

U.S. PATENT DOCUMENTS

| 2,505,923 | 5/1950 | Taylor et al. ............ 254/132 |
| 2,740,210 | 4/1956 | Hamborg ............ 254/132 X |
| 2,807,494 | 9/1957 | Bulfer ............ 254/132 |

Primary Examiner—Robert C. Watson
Attorney, Agent, or Firm—Wood, Herron & Evans

[57] ABSTRACT

An improved post puller includes a U-shaped grapple and a pivot mount providing both a generally vertical pivot position for connection of the grapple to a draw bar and a base for mounting an operating handle thereto. One alternate embodiment provides adjustability. Further, the handle and pivot axis are specifically disposed in varying alternate positions for first rotating the grapple to grasp a post and then to permit rotation about another axis for post pulling. Another alternate embodiment includes a double grapple and actuating apparatus for opening and closing it about a post.

17 Claims, 10 Drawing Figures

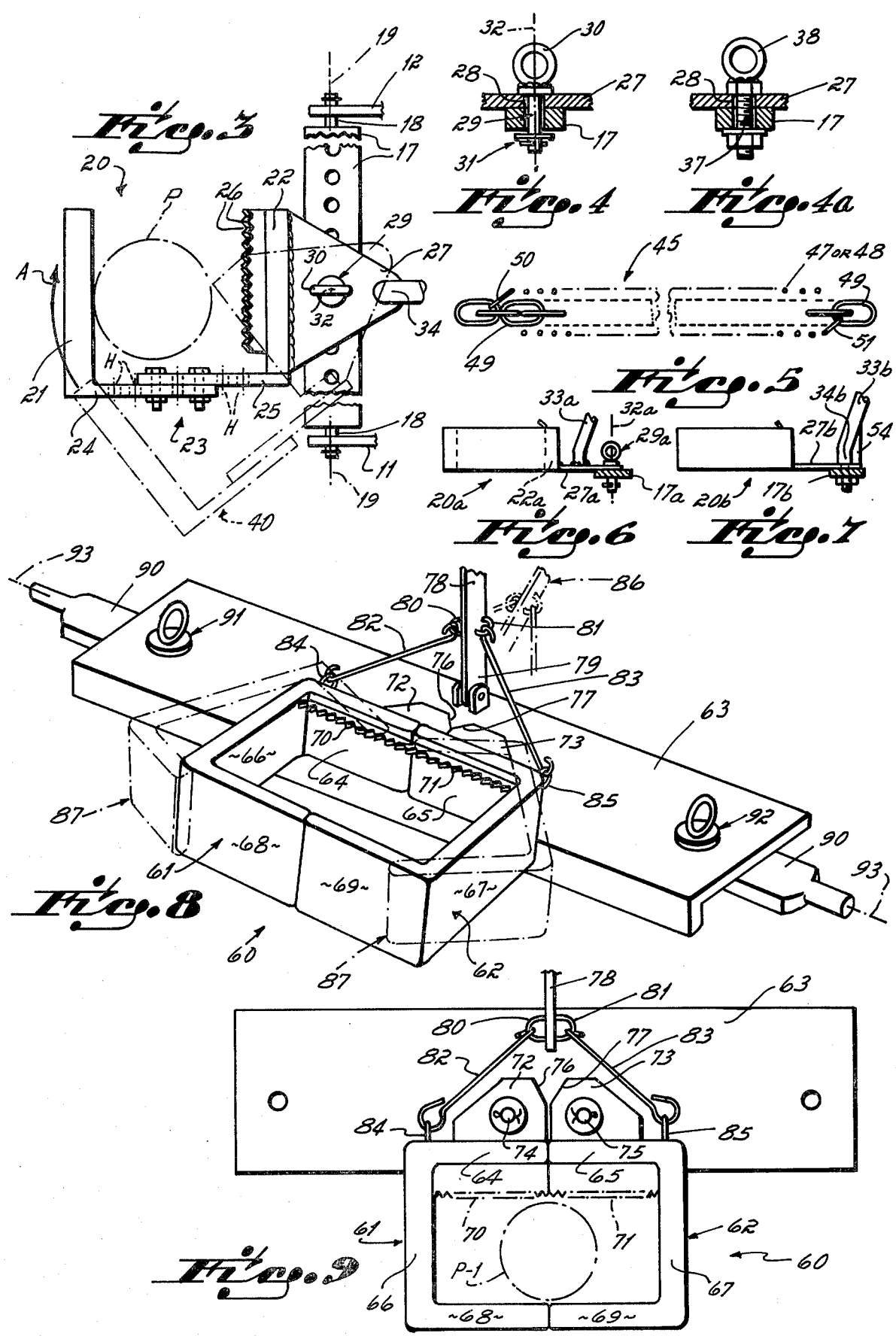

POST PULLER

This invention relates to apparatus for pulling posts and more particularly to apparatus for attachment to the ordinary three-point hitch of a tractor for pulling posts of varying diameters.

Post pullers and post grapples operating on a post binding or on a cramping principle are well known in the art. For example, U.S. Pat. Nos. 3,479,012, 2,807,494, 2,740,210 and 2,505,923, show post pullers adapted for use with tractors and operating on this principle. U.S. Pat. Nos. 2,926,890 and 2,777,726 show specific forms of post binding or cramping grapples.

While the grappling by cramping principle appears to provide efficient means for gripping a post, the overall apparatus and operation of the various known devices leave something to be desired. Namely, the known devices are relatively complex in structure and costly or are rather difficult to operate from a sitting position on the tractor.

Accordingly, it is one objective of this invention to provide an improved post puller.

A further objective of this invention has been to provide an improved post puller for attachment to a tractor and which can easily be operated from the seat thereof.

A further objective of this invention has been an improved adjustable post puller for attachment to the three-point hitch of a tractor.

To these ends, a preferred embodiment of a post puller according to this invention comprises a U-shaped grapple having two parallel jaws connected by a bight element, a pivotal mounting means extending from one of the jaws, means inboard of the mounting means for pivoting the grapple to a draw bar and a handle mounted on the mounting means opposite the pivot means from the jaws. When mounted to the draw bar of a three-point tractor hitch, the handle can be manually operated to pivot the jaws about a post, to urge the jaws to bind the post by pivoting them around the generally horizontal longitudinal axis of the draw bar and, after the post is pulled, to manipulate the jaws to release the pulled post or to obtain a second position thereon for further pulling.

In one alternate embodiment, the jaws are adjustable with respect to each other for accepting varying sizes of posts.

In another alternate embodiment, the handle and pivot mounting positions are reversed, while in a further embodiment, the lower end of the handle is attached to and also extends through the mounting means to itself provide one pivot axis for the jaws.

In a still further embodiment, the post puller includes two U-shaped grapples, opening toward each other and pivoted to a mounting plate for moving between open and closed positions about a post. Each grapple is connected by a rigid link to a handle which is also pivoted to the mounting plate. Forward movement of the handle operatively opens the grapples for receipt of a post, while rearward movement of the handle operatively closes the grapples for engaging a post to be pulled. Stop means are provided for limiting the opening movement.

All embodiments are adapted for use in connection with the typical three-point hitch of a tractor, and can be easily attached to or removed therefrom as needed. While the single grapple offers a puller with no moving parts of its own, the double grapple puller offers a simplified totally enclosed but releasable grapple with a minimum of moving parts.

These and other advantages and modifications will become readily apparent from the following detailed description of a preferred and alternate embodiment of the invention and from the drawings in which:

FIG. 3 is a plan view of an alternate embodiment of the invention attached to the draw bar of a tractor hitch;

FIGS. 4 and 4a are cross-sectional views of alternate pivot pins;

FIG. 5 is an illustrative view of a flexible spring tensioned retainer;

FIGS. 6 and 7 are elevational views of alternate embodiments of the invention;

FIG. 8 is a perspective view of a double-grapple alternate embodiment of the invention; and FIG. 9 is a plan view of the embodiment of FIG. 8.

Figure 1:
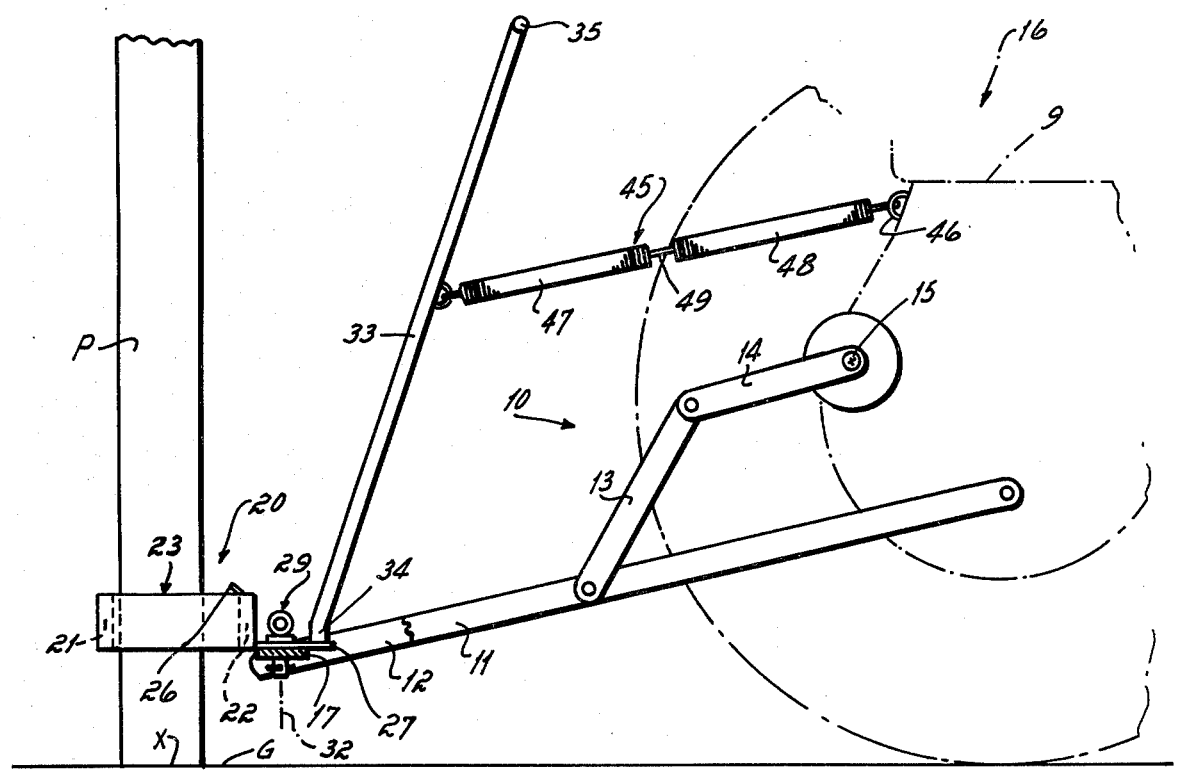
FIG. 1 is an elevational view of a preferred embodiment of the invention attached to a tractor and in position to pull a post.
Figure 2:
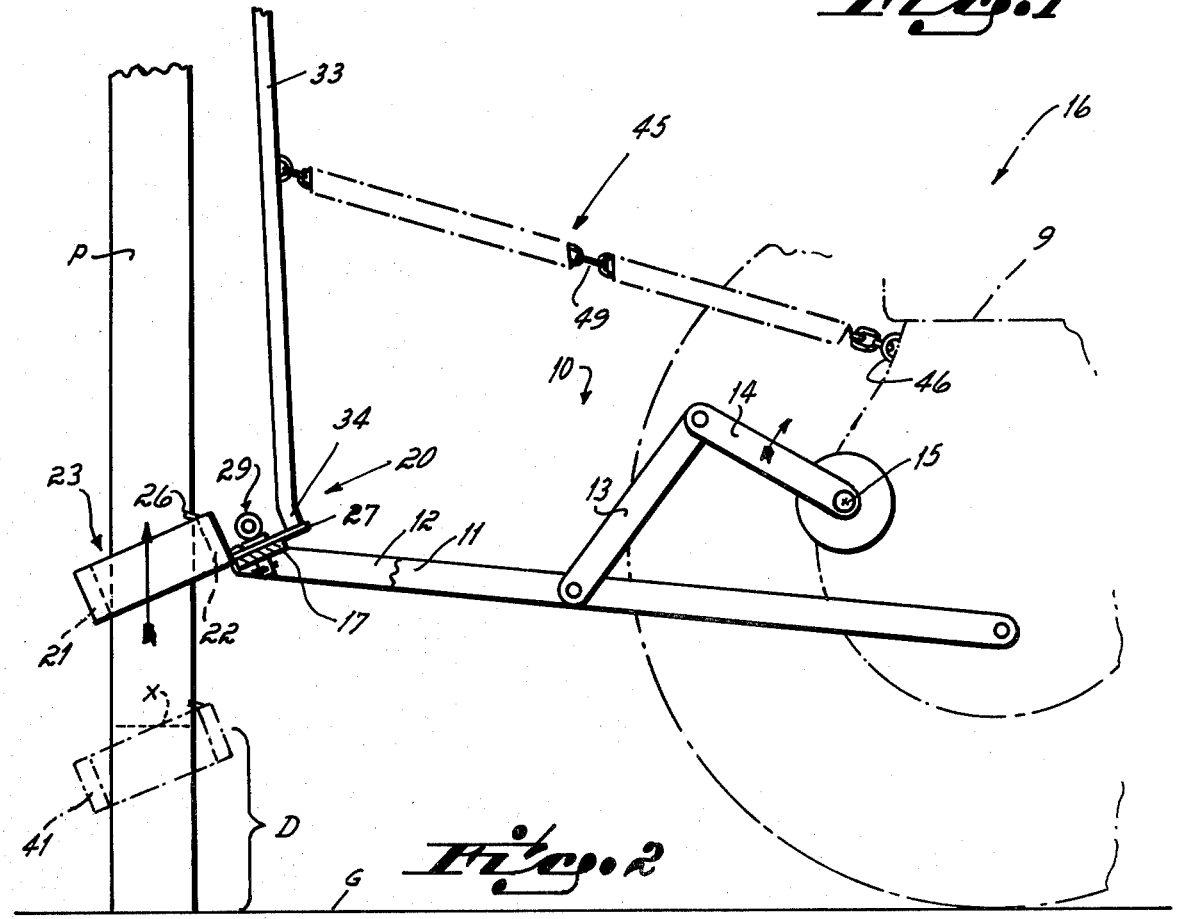
FIG. 2 is an elevational view similar to FIG. 1 but with the post in a pulled position.

Turning now to the drawings, a preferred embodiment of the invention is depicted in FIGS. 1, 2 and 4 thereof and as slightly modified in FIG. 3. Preferably, the invention is adapted for use in connection with tractors and particularly with the ordinary three-point hitch of tractors. One such three-point tractor hitch is shown in U.S. Pat. No. 2,505,923.

As depicted in these drawings, however, a typical three-point tractor hitch 10 includes right and left stabilizer arms 11 and 12, two lift arms 13 (one of which is not shown in FIGS. 1 and 2), each having a lower end connected to a respective stabilizer arm and an upper end connected to a lever arm 14 which is rotatable about the axis 15 of a hydraulic mechanism (not shown) associated with the tractor 16 (shown diagrammatically in FIGS. 1 and 2). In use, the hydraulic system of the tractor can be actuated to lift the lever arm 14 about the axis 15 and thereby to draw the lift arms 13 and the stabilizer arms 12 and 11 upwardly. By way of further example and not limitation, the rearward and forward jaws have inner surfaces facing each other about eight inches apart, are made from ¾ inch thick steel and are about three inches from top to bottom. Overall width from the closed to the open side of the grapple is about eight inches also. Of course, all the dimensions herein can be varied as desired according to the invention.

A preferred embodiment of the invention is illustrated in FIGS. 1–2. This embodiment constitutes a single grapple 20 comprising a rearward jaw 21, a forward jaw 22 and a bight portion 23. Preferably the bight portion comprises a single member.

In a modified alternate embodiment as shown in FIG. 3, however, the bight portion comprises a first bight element 24 attached to the rearward jaw 21, and a second bight element 25 attached to the forward jaw 22. Each of the bight elements has a plurality of holes H such that the bight portion can be joined at different positions in order to space the jaws 21 and 22 at varying distances apart, all for the purpose of accommodating poles or posts of varying diameters. The forward jaw 22 is provided on a rearward side thereof with teeth 26 at about 55° angle from the horizontal for the purpose of enhancing the grip of the grapple on a pole to be lifted.

It should be appreciated that the grapple, via the adjustable bight accommodates varying diameter posts or poles depending on the adjustable spacing between the jaws 21 and 22, and, of course the vertical height between the teeth 26 and the bottom of jaw 21 which actually engage the post.

Apart from this modification as shown in FIG. 3, the preferred embodiment appears in plan view similar to FIG. 3, but with a single non-adjustable bight member.

Further, in the preferred embodiment, the forward jaw 22 is provided with pivot mounting means in the form of a plate 27 which extends forwardly of the forward jaw 22. The plate 27, by way of example, is about 3⅛ inches from front to rear and about 9/16 inch thick. The plate is provided with a bore 28 for receipt of a pivot pin 29 having a shank and an eye member 30. The shank of the pivot pin 29 extends through the plate 27 and downwardly for connection to a draw bar 17 which actually comprises a portion of the three-point tractor hitch 10. The draw bar 17 is mounted between stabilizer arms 11 and 12 on the shafts 18 and thus the draw bar is pivotable about a generally horizontal and longitudinal axis 19. The pin 29 is preferably provided with a washer and hairpin-type clip 31 at the bottom thereof as shown in FIG. 4 for releasably securing the pin. Alternately, a pin 37 of FIG. 4a could be used wherein the pin is threaded and a nut or other fastener is used as shown. Such construction is more hefty and permits auxiliary lifting of the grapple via attachment of eye 38 to a loader, or other lifting equipment.

As will be appreciated, the grapple and plate 27 are thus rotatable about a generally vertical axis 32 (FIG. 1). For example, the grapple 20 is shown in solid lines in one position in FIG. 3, but is rotatable about the axis 32 to the position shown in the dotted lines of FIG. 3.

Further included in the grapple 20 is an upwardly extending handle 33 having a lower end 34 connected to the plate 27. The handle has an upper end 35 for manual operation by an operator who may be seated in the tractor seat 9 associated with the tractor 16 as depicted in FIGS. 1–3. The handle as shown is mounted on an opposite side of the axis 32 from the jaws 21 and 22 in this embodiment.

In use, the tractor 16 is backed up to the vicinity of a post P which has been sunk into the ground G to the depth line X. The operator of the tractor, without getting down from the seat, manipulates the handle 33 to rotate the grapple into the dotted line position 40 as shown in FIG. 3. He then finally positions the tractor with respect to the post P and then manipulates the handle 33, again without moving from the tractor seat, to move the jaws 21 and 22 in the direction of the arrow A to surround the post P as shown in the solid line position of FIG. 3. Thereafter, the operator actuates the hydraulic system (not shown) of the tractor to activate the three-point hitch and rotate the lever arm 14 about the axis 15. This lifts the lift arm 13 and the stabilizer arms 11 and 12. As these arms lift, the jaws 21 and 22 engage the post P and bind it or cramp it therebetween with the teeth 26 providing a nonslip connection between the grapple and the post.

Continued operation of the tractor's hydraulic system serves to lift the stabilizer arms, the draw bar and the grapple as shown in FIG. 2. During this motion, the grapple rotates about the generally horizontal axis 19, thus gripping the post and lifting it from the ground G.

The initial position of the grapple 20, as shown in FIG. 1, is shown in the dotted lines 41 in FIG. 2. Thus the grapple 20 is operable to pull the post out of the ground a distance D as illustrated in FIG. 2. While in many cases a complete removal of a post requires only a single motion of the tractor hitch, it is possible that a post may be so deeply or firmly inserted that it will be necessary to regrasp it at a lower position than is shown in FIGS. 1 and 2 and pull it upwardly again to completely remove it. Once the post has been removed, it is a simple operation for the operator of the tractor to manipulate the upper end of the handle 35 to swivel the grapple 20 about the axis 32 and thereby remove the grapple 20 from the post P. Of course, some further backward and forward manipulation of the handle 33 may be required in order to dislodge the post.

In order that the grapple and its associated handle will not rotate too far rearwardly a flexible retainer 45 is connected between an intermediate point of the handle 33 and a point 46 at the rear end of the tractor. Preferably, the flexible retainer 45 constitutes a spring loaded chain as shown wherein two coil springs 47 and 48 surround the flexible chain 49. The details of both springs and chain are best seen in FIG. 5 with respect to spring 48. In FIG. 5, the coil spring 48 has two ends connected at 50 and at 51 to the chain 49. The spring is so connected to the chain that when the spring is in a relaxed condition, the chain is slack between the points 50 and 51. However, when the handle 33 moves rearwardly, the chain is extended which thus pulls the spring 48 into a tensioned position and thereby provides elasticity to the flexible link 45. Of course, it may be suitable to simply use a single spring or more than two springs in order to provide the flexible link as desired.

ALTERNATE EMBODIMENTS

The alternate embodiment of FIG. 3 has been described above. Various other alternate embodiments of the invention will now be described. Particularly, FIG. 6 illustrates one alternate embodiment wherein the positions of the mounting pin 29a and the handle 33a are simply reversed on the mounting plate 27a. Thus, in this embodiment, the attachment of the handle to the mounting plate 27a is between the jaw 22a and the pin 29a and axis 32a. This embodiment has been found suitable, however, it lacks the more advantageous leverage which is provided by the relationship of the handle and the two pivot axes of the preferred embodiment.

In a further embodiment as shown in FIG. 7, the mounting plate 27b is not provided with any bore for a mounting pin 29, rather the handle 33b has a lower end 34b which is attached to the plate 27b and extends downwardly through the plate, as shown in FIG. 7, for attachment to the draw bar 17b. The lower end 34b of the handle is then either threaded or provided with a suitable fastener so that the handle performs both functions of handle and of pivotal mounting. In this connection, it should be appreciated that the lower end 34b of the handle could be connected to the plate 27b by further means of a gusset 54 which is welded, for example, between the lower end of the handle and the plate for the purpose of strengthening the handle. This structural feature could be used on the preferred or the alternate embodiments which have been described.

Another alternate embodiment is illustrated in FIGS. 8 and 9 of the drawings. This embodiment contemplates a double grapple 60 and comprises two U-shaped grapples 61 and 62 opening toward each other and pivoted to a mounting plate 63. Each of the U-shaped grapples 61 and 62 includes a forward jaw, 64 and 65, respectively, a bight portion, 66 and 67, respectively, and a rearward jaw, 68 and 69, respectively. The forward jaws 64 and 65 are each provided with teeth means 70 and 71, respectively, for gripping a post.

Each of the U-shaped grapples 61 and 62 is pivoted to mounting plate 63 by means of pivot plates 72 and 73, respectively. Each pivot plate includes a bore therethrough and a pivot pin 74 and 75, respectively, for pivotally mounting the U-shaped grapples to the mounting plate 63. Each pivot plate has a stop surface 76 and 77, respectively, which are ordinarily inclined with respect to each other as shown in FIG. 9 when the grapple is closed.

The double grapple 60 further includes a handle 78 which has a lower portion 79 pivotally mounted to the plate 63, as shown in FIG. 8. Near the lower portion 79 of the handle, loops 80 and 81 are connected thereto. Rigid lengths 82 and 83 are respectively connected to the loops 80 and 81 and extend rearwardly to connect with respective loops 84 and 85 on the respective forward jaws 64 and 65. When the handle is moved forwardly to the phantom line position 86, it pulls links 82 and 83 to move grapples 61 and 62 about pins 74 and 75 to an open position as shown by the dotted lines noted at 87. In this position, the stop surfaces 76 and 77 abut to limit the open position of the double grapple 60. In use, the double grapple 60 is mounted by the mounting plate 63 to a draw bar 90 of an ordinary three-point tractor hitch such as described with respect to the first embodiment. For this purpose, pins 91 and 92, which are similar to the pins described in FIGS. 4 or 4a, can be used to mount the mounting plate to the draw bar 90. In this embodiment, however, it will be appreciated that the mounting plate 63 does not rotate with respect to the draw bar, but rather the draw bar 90 is still operable to pivot about the axis 93.

In use then, the tractor or lifting apparatus is positioned proximate a post P-1. With the handle 78 pulled forwardly, the double grapple 60 is opened and the apparatus is moved into operative position with respect to the post P-1. Thereafter, the handle 78 is moved rearwardly, all without the operator moving from the seat of his tractor or lifting apparatus, and the hitch or lifting apparatus is operative to raise the draw bar 90 and thus the double grapple with respect to the post. The teeth 70 and 71 bite into the post and the double grapple pivots about the axis 93 in order to further bind and cramp the post for pulling it from the ground. Similarly to the pulling orientation of the preferred embodiment shown in FIGS. 1 and 2, once the post has been pulled the handle 78 is moved forwardly to open the grapple and release the post. It should be appreciated that the preferred and various alternate embodiments provide simplified and improved post pulling apparatus for particular utilization with a three-point hitch of a tractor or with any other lifting apparatus for the purpose of efficiently and quickly removing posts.

All of these and further modifications and advantages will be readily appreciated by those of ordinary skill in the art without departing from the scope of this invention and the applicant intends to be bound only by the claims appended hereto.

I claim:

1. Apparatus for use with a three-point tractor hitch having a draw bar means being upwardly movable and being rotatable about a substantially horizontal first axis, said apparatus for pulling posts upwardly from the ground and comprising:

a U-shaped, three-sided post grapple having two opposing jaws connected together and defining a grapple open at one end, pivot mounting means extending outwardly from one of said jaws for pivotally mounting said grapple to said draw bar means for pivoting about a second axis perpendicular to said first axis, and handle means attached to said pivot mounting means on an opposite side of said second axis from said grapple, said handle means extending upwardly from said pivot mounting means to permit manual pivoting of said grapple about both said first axis and said second axis, whereby said jaws are operable to engage a post, pivoting said grapple about said first axis, and pull said post from the ground when said draw bar is moved upwardly.

2. Apparatus as in claim 1 wherein said pivot mounting means includes a plate member extending from said one jaw, a hole inboard of said plate member, a pivot pin extending through said hole for attaching said grapple to a draw bar means and said handle means being attached to said plate member on an opposite side of said hole from said one jaw.

3. Apparatus for use with a three-point tractor hitch having a draw bar means being upwardly movable and being rotatable about a substantially horizontal first axis, said apparatus for pulling posts upwardly from the ground and comprising:

a U-shaped, three-sided post grapple having two opposing jaws connected together and defining a grapple open at one end, pivot mounting means extending outwardly from one of said jaws for pivotally mounting said grapple to said draw bar means for pivoting about a second axis perpendicular to said first axis, and handle means attached to said pivot mounting means between said one jaw and said second axis, said handle means extending upwardly from said pivot mounting means to permit manual pivoting of said grapple about both said first axis and said second axis, whereby said jaws are operable to engage a post, pivot said grapple about said first axis, and pull said post from the ground when said draw bar is moved upwardly.

4. Apparatus as in claim 3 wherein said pivot mounting means includes a plate member extending from said one jaw, a hole inboard of said plate member, a pivot pin extending through said hole for attaching said grapple to a draw bar means, and said handle means being attached to said plate member between said one jaw and said hole.

5. Apparatus as in claims 1 or 3 wherein said pivot pin includes hook means on the upper end thereof adapted for connection to a lifting means.

6. Apparatus as in claims 1 or 3 wherein said jaws are connected together by a bight portion extending perpendicularly to each jaw, said bight portion comprising a first element connected to one jaw and a second element connected to another jaw, and means for connecting said first and second elements of said bight element together in selectively different positions to selectively space said jaws at differing positions apart from each other to accommodate poles of varying sizes.

7. Apparatus for pulling posts upwardly from the ground and comprising:

a U-shaped, three-sided post grapple having two opposing jaws connected together and defining a grapple open at one end, pivot mounting means extending outwardly from one of said jaws for pivotally mounting said grapple to a draw bar means for pivoting about an axis perpendicular to the horizontal, and handle means attached to said pivot mounting means on an opposite side of said axis from said grapple, said handle means extending upwardly from said pivot mounting means to permit manual pivoting of said grapple about both said axis and about a horizontal axis, whereby said jaws are operable to engage a post, pivot said grapple about said first axis, and pull said post from the ground when said apparatus is raised.

8. Apparatus for pulling posts upwardly from the ground and comprising:

a U-shaped, three-sided post grapple having two opposing jaws connected together and defining a grapple open at one end, pivot mounting means extending outwardly from one of said jaws for pivotally mounting said grapple to a draw bar means for pivoting about an axis perpendicular to the horizontal, and handle means attached to said pivot mounting means between said one jaw and said axis, said handle means extending upwardly from said pivot mounting means to permit manual pivoting of said grapple about both said axis and about a horizontal axis, whereby said jaws are operable to engage a post, pivot said grapple about said first axis, and pull said post from the ground when said apparatus is raised.

9. Apparatus as in claims 1, 3 or 7 including a spring loaded flexible retaining means attached at one end to said handle above said pivot mounting means and adapted for attachment to a tractor at another end.

10. Apparatus as in claim 9 wherein said flexible retaining means comprises a link chain and at least one coil spring surrounding said chain, said spring having its respective ends attached to said chain such that when said chain is tensioned, said coil spring is also tensioned, said coil spring being normally relaxed and said chain being normally slack between the end of said coil spring.

11. Apparatus for pulling posts upwardly from the ground and comprising:

a U-shaped, three-sided post grapple having two opposing jaws connected together and defining a grapple open at one end, pivot mounting means extending outwardly from one of said jaws for pivotally mounting said grapple to a draw bar means for pivoting about an axis perpendicular to the horizontal, and handle means attached to said pivot mounting means and having a lower end extending therethrough, said handle means extending upwardly from said pivot mounting means to permit manual pivoting of said grapple about both said axis and about a horizontal axis, whereby said jaws are operable to engage a post, pivot said grapple about said first axis, and pull said post from the ground when said apparatus is raised, and wherein said lower end of said handle includes means for pivotally attaching said apparatus to said draw bar means for raising said apparatus.

12. Apparatus for pulling posts and including:
a mounting plate, a pair of three-sided U-shaped grapples each having forward and rearward spaced jaws joined by a bight portion, each grapple having an open side opening toward the other grapple, pivot mounting means extending from a forward jaw of each grapple, said pivot mounting means pivotally mounting each of said grapples to said mounting plate for rotation about a respective substantially vertical pivot axis, said jaws and bight portions being disposed in a plane substantially perpendicular to said pivot axis, pivotable handle means mounted on said plate, and means connecting said handle means to portions of said grapples outboard of said pivot mounting means whereby selective movement of said handle is operable to pivot respective rearward jaws of said grapples away from each other to open said grapples for receipt of a post, and whereby subsequent rearward movement of said handle is operable to move said rearward jaws together to close said grapples for gripping a post to pull it.

13. Apparatus as in claim 12 wherein said handle has a lower end pivotally connected to said mounting plate and wherein said connecting means includes two rigid links each respectively attached at one end to respective forward jaw outboard of said respective pivot axis and each having another end connected to said handle above the lower end thereof.

14. Apparatus as in claim 12 wherein said pivot mounting means comprises a pivot plate attached to each of said forward jaws, a hole therethrough, and pin means in each pivoting said pivot plate to said mounting plate.

15. Apparatus as in claim 14 wherein each of said plates has a stop surface thereon, said stop surfaces inclined with respect to each other when said grapples are closed and said stop surfaces abutting each other when said grapples are open to limit the pivoting of said grapples in an open position.

16. Apparatus as in claim 12 where said apparatus is adapted for mounting on a draw bar of a three-point tractor hitch and further including means for releasably mounting said mounting plate to a draw bar.

17. Apparatus for use with a three-point tractor hitch having a draw bar means being upwardly movable and being rotatable about a substantially horizontal first axis, said apparatus for pulling posts upwardly from the ground and comprising:

a U-shaped, three-sided post grapple having two opposing jaws connected together and defining a grapple open at one end, pivot mounting means extending outwardly from one of said jaws for pivotally mounting said grapple to said draw bar means for pivoting about a second axis perpendicular to said first axis, and handle means attached to said pivot mounting means and extending upwardly from said pivot mounting means to permit manual pivoting of said grapple about both said first axis and said second axis, whereby said jaws are operable to engage a post, pivoting said grapple about said first axis, and pull said post from the ground when said draw bar is moved upwardly.

* * * * *

UNITED STATES PATENT AND TRADEMARK OFFICE
CERTIFICATE OF CORRECTION

PATENT NO. : 4,226,402
DATED : October 7, 1980
INVENTOR(S) : James E. Muth

It is certified that error appears in the above-identified patent and that said Letters Patent are hereby corrected as shown below:

Col. 3 Line 12 "1/3" should be --7/8--

Signed and Sealed this

Seventeenth Day of March 1981

[SEAL]

Attest:

Attesting Officer

RENE D. TEGTMEYER

Acting Commissioner of Patents and Trademarks